United States Patent
Harney et al.

(10) Patent No.: US 10,123,297 B1
(45) Date of Patent: Nov. 6, 2018

(54) SYSTEM, METHOD AND DEVICES FOR PERFORMING WIRELESS TRACKING

(71) Applicant: Lokatur, Inc., Pleasant Grove, UT (US)

(72) Inventors: Michael John Harney, Pleasant Grove, UT (US); Michael Stringham, Pleasant Grove, UT (US)

(73) Assignee: LOKATUR, INC., Pleasant Grove, UT (US)

( * ) Notice: Subject to any disclaimer, the term of this patent is extended or adjusted under 35 U.S.C. 154(b) by 0 days.

(21) Appl. No.: 15/674,252

(22) Filed: Aug. 10, 2017

(51) Int. Cl.
*H04W 64/00* (2009.01)
*G01C 21/36* (2006.01)
*H04B 17/318* (2015.01)
*H04W 4/80* (2018.01)

(52) U.S. Cl.
CPC ........ *H04W 64/00* (2013.01); *G01C 21/3644* (2013.01); *G01C 21/3664* (2013.01); *G01C 21/3688* (2013.01); *H04B 17/318* (2015.01); *H04W 4/80* (2018.02)

(58) Field of Classification Search
CPC .... H04W 64/00; H04W 4/80; G01C 21/3644; G01C 21/3664; G01C 21/3688; H04B 17/318
See application file for complete search history.

(56) References Cited

U.S. PATENT DOCUMENTS

| | | | |
|---|---|---|---|
| 7,145,555 B2 | 12/2006 | Taylor et al. | |
| 7,590,720 B2 * | 9/2009 | Bahl | H04L 29/06 342/118 |
| 8,855,677 B2 * | 10/2014 | Wigren | G01S 5/0009 455/456.2 |
| 2008/0102859 A1 * | 5/2008 | Karr | G01S 13/825 455/456.3 |
| 2010/0090901 A1 * | 4/2010 | Smith | G01S 5/021 342/451 |
| 2010/0277363 A1 * | 11/2010 | Kainulainen | G01S 3/023 342/174 |
| 2016/0037300 A1 * | 2/2016 | Vitek | H04W 4/023 455/456.3 |

OTHER PUBLICATIONS

Harney, "A Method of Triangulating Point Sources Using Omnidirectional Sensors", vol. 13, No. 4, Oct. 2006, pp. 455-461.

* cited by examiner

*Primary Examiner* — Khai M Nguyen
(74) *Attorney, Agent, or Firm* — Goodhue, Coleman & Owens, P.C.

(57) ABSTRACT

A system and method for locating a target device. A calibration process is performed by taking a number of measurements utilizing a host device receiving wireless signals from a number of environmental devices at points along a pattern. Signal strength is analyzed for each of the environmental devices to determine calibration information. Wireless signal information is received from a target device including at least signal strength associated with the environmental devices proximate the target device. The location of the target device is determined utilizing at least the calibration information and the wireless signal information.

20 Claims, 8 Drawing Sheets

SYSTEM, METHOD AND DEVICES FOR PERFORMING WIRELESS TRACKING

BACKGROUND

I. Field of the Disclosure

The illustrative embodiments relate to a method of performing wireless tracking. More specifically, but not exclusively, the illustrative embodiments relate to wirelessly tracking one or more devices or components.

II. Description of the Art

The utilization of various types of wireless devices, systems, and equipment has grown nearly exponentially in recent years. Tracking these wireless devices has become desirable and in some cases necessary. Many tracking systems fail in different environments or situations.

SUMMARY OF THE DISCLOSURE

One embodiment provides a system, method, and device for locating a target device. A calibration process is performed by taking a number of measurements utilizing a host device receiving wireless signals from a number of environmental devices at points along a pattern. Signal strength is analyzed for each of the environmental devices to determine calibration information. Wireless signal information is received from a target device including at least signal strength associated with the environmental devices proximate the target device. The location of the target device is determined utilizing at least the calibration information and the wireless signal information.

One embodiment provides a system, method, and a host device for performing tracking. The host device may include a processor for executing a set of instructions. The host device may further include a memory for storing the set of instructions. The host device may further include a touch screen for interacting with a user based on the execution of the set of instructions. The set of instructions are executed to perform a calibration process by taking a number of measurements utilizing a receiver of the host device receiving wireless signals from a number of environmental devices at points along a pattern, analyze signal strength for each of the environmental devices to determine calibration information, receive wireless signal information from a target device including at least signal strength associated with proximate ones of the environmental devices, determine the location of the target device utilizing at least the calibration information and the wireless signal information.

BRIEF DESCRIPTION OF THE DRAWINGS

Illustrated embodiments are described in detail below with reference to the attached drawing figures, which are incorporated by reference herein, and where.

DETAILED DESCRIPTION OF THE DISCLOSURE

The illustrative embodiments provide a system, method, and devices for tracking wireless devices. The system may be utilized to monitor or track a target device. The target device may represent any number of wireless device, tags, tracking components, or so forth. A number of environmental devices communicate with the target device. The environmental devices may utilize any number of signals, protocols, or connections to communicate with the target devices. A host device processes information to track the target device. In one embodiment, the host device is a mobile phone, tablet, gaming system entertainment system, or other mobile device. In one embodiment, a locator device is tracked as a virtual beacon. The signal strength and other applicable information applicable to the target device/virtual beacon are communicated to the host device for analysis. A mobile application may be treated as a virtual beacon for purposes of tracking the device. In one embodiment, multiple wireless devices in a communications environment may be utilized to communicate with the device.

In one embodiment, one of the environmental devices may be a fixed device/point. In one embodiment, the fixed device is determined by performing a calibration. The calibration may represent a pattern or method performed with the locating device. In one embodiment, the user may move the host device or another device/beacon in a pattern (e.g., a square, circle, triangle, line, etc.). The signal strength values may be recorded at multiple points of the pattern (e.g., vertices, corners, etc.). The center of the pattern may be utilized as an original of a coordinate system that is used to determine and report the location of the target device. The location and signal strength of the environmental devices may be determined during a calibration step or process (e.g., performed for the host device, target device, environmental device, etc.) relative to the center of a pattern (i.e., the origin, 0,0,0 of the coordinate system). The target device may also be used initially in a calibration process by placing the target device in the center of the pattern being navigated. This gives information on the signal strength of the target device which can be used later in tracking the target device along with the reception of the signal strength from the environmental devices. For example, a tracking token or fob connected to a set of keys and utilized in a home may be calibrated and measured in the home to get readings and measurements that may be subsequently utilized. In one embodiment, the target devices may represent Bluetooth, Wi-Fi, cellular, or other wireless signals. The environmental devices with the biggest separation distances may be utilized.

Determining the location of environmental devices during a calibration process or step may be performed by determining the signal strength detected by a host/target device in an applicable environment. For example, the signal strength and/or coordinate positions associated with the environmental devices may be determined for points along a pattern in the center of the environment (e.g., business, home, school, stadium, venue, field, etc.), such as an origin 0,0,0, for performing future location processes as a two-dimensional or three-dimensional process.

Figure 1:
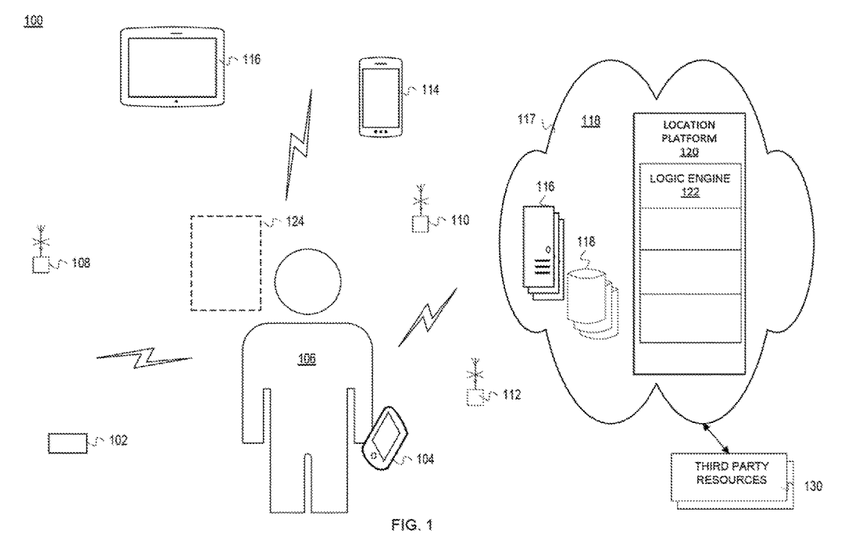
FIG. 1 is a pictorial representation of a communications environment in accordance with an illustrative embodiment.

FIG. 1 is a pictorial representation of a communications environment 100 in accordance with an illustrative embodiment. The communications environment 100 may represent any number of environments in which a target device 102 may be located. The communications environment may include a wireless device 104, a user 106, environmental devices 108, 110, 112, wireless devices 114, 116, cloud system 114, cloud network 115, servers 116, databases 118, location platform 120, and logic engine 122.

The target device 102 may represent any number of electronic devices. In one embodiment, the target device 102 may be attached to other electronics as a location tag. The target device 102 may also utilize a specialized location application in conjunction with a logic engine/processor and transceiver/signal detector.

In one embodiment, the target device 102 may determine which of the devices in the communications environment 100 are within range (e.g., are identifiable with a corresponding signal strength). For example, the target device 102 may determine that environmental devices 108, 110, 112 and wireless device 114 are within range (the wireless device 116 may be out-of-range). The target device 102 may gather information that does not invade privacy or so forth. The target device 102 may communicate the available device identifiers and associated signal strength to the wireless device 104 or to the cloud communications system 117 or other available devices within the communications environment 100. The wireless signal information applicable to the target device 102 may be gathered without violating the privacy or security of devices in the communications environment 100.

In one embodiment, the user 106 may walk a pattern 124 to perform calibration within the communications environment 100. In one embodiment, during calibration, the wireless device 104 may perform signal measurements for each of the environmental devices 108, 110, 112, and the wireless devices 114, 116 (as well as any other available devices) at each corner of the pattern 124. As shown the pattern 124 may represent a 10-foot square walked by the user 106 with the wireless device 104. The wireless device 104 may perform measurements of all available devices at each corner of the pattern 124. In one embodiment, a tracking application executed by the wireless device 104 may utilize a calibration mode to take multiple readings associated with the pattern 124. For example, the application may audibly, verbally, or textually prompt the user to stop at the corners of the square to take measurements for each of the available devices (e.g., environmental devices 108, 110, 112, wireless devices 114, 116, etc.). As shown the environmental devices 108, 110, 112 and wireless devices 114, 116 may be randomly positioned within the communications environment 100.

Wireless signals within the communications environment 100 may utilize one or more different standards, protocols, networks, or signals. For example, the communications environment 100 may represent one or more Bluetooth, Wi-Fi, cellular, wireless data, satellite, and other radio frequency signals as well as land-line or wired infrastructure. Wireless signals may be sent between multiple devices (as shown by signal representations, lines, or dashed lines).

Figure 2:
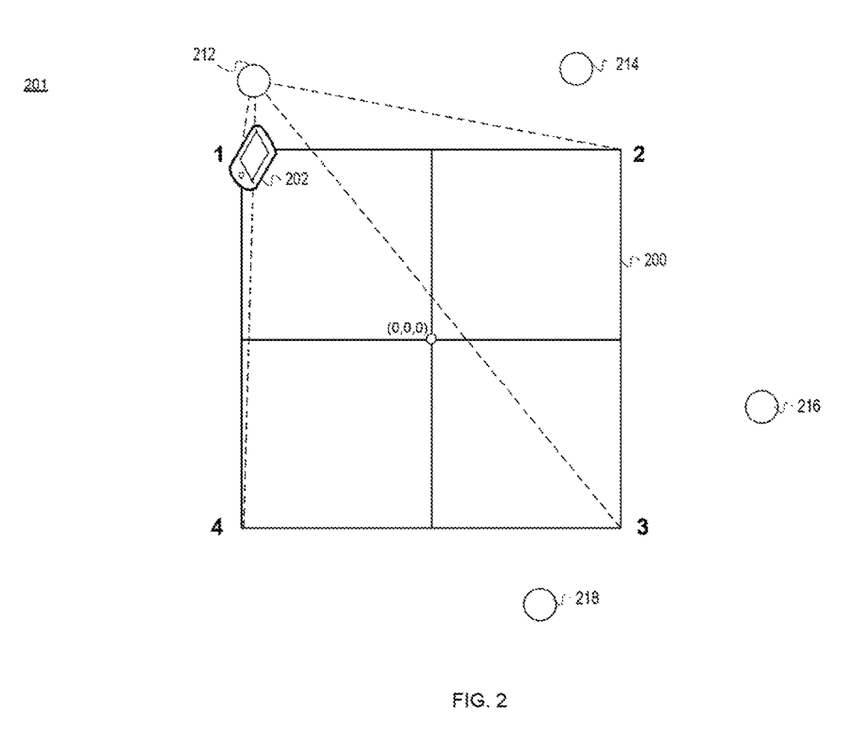
FIG. 2 is a pictorial representation of a location pattern in accordance with an illustrative embodiment.

FIG. 2 is a pictorial representation of a location pattern 200 in accordance with an illustrative embodiment. In one embodiment, the location pattern 200 may represent a portion of the communications environment 100 of FIG. 1 represented as 201. As noted, the location pattern 200 may represent any number of shapes, paths, or routes (symmetric or asymmetric) available to the user and associated wireless device 202. The pattern 200 may be walked, driven, flown, or otherwise navigated. The pattern 200 may be performed based on user interactions or in response to an automated process, system, or device. The locations, 1, 2, 3, and 4 may represent locations or positions of a wireless device 202. For example, the locations 1, 2, 3, 4 may represent corners on points of the location pattern 200. The locations 1, 2, 3, 4 may represent calibration points used between the wireless device 202 and the environmental devices 212, 214, 216, 218 when travelling the location pattern 200.

The environmental devices 212, 214, 216, 218 may be randomly placed within the communications environment 201. In one embodiment, the environmental devices 212, 214, 216, 218 may represent electronic devices that communicate one or more different types of communications signals. For example, Bluetooth signals or connections from the environmental devices 212, 214, 216, 218 may communicate with or be detected by the smart phone 202. As shown, measurements of the environmental device 212 may be made by the wireless device 202 at each of the locations 1, 2, 3, 4. The measurements of signal strength and other wireless signal information may also be performed for the other environmental devices 214, 216, 218 at each of the locations 1, 2, 3, 4 (e.g., see FIG. 3).

In one embodiment, the user may be given instructions for walking or navigating the pattern 200. For example, an application on a smart phone utilized by the user may provide audible and/or text based instructions to "walk a square with 5 feet sides in the search area and pause at each corner." The wireless device 202 may take measurements of the strength of the signals from each of the environmental devices 212, 214, 216, 218. The measurements of signal strength may be recorded for each of the environmental devices 212, 214, 216, 218 at the locations 1, 2, 3, 4 by the wireless device 202. The wireless device 202 may also be able to determine information, such as relative location of each of the locations 1, 2, 3, 4. The measurements may be stored locally in the smart phone 202 or may be sent to any number of devices, systems, or equipment. For example, the measurements of signal strength may be sent to a cloud-based system. The user may be asked to revisit certain locations 1, 2, 3, 4 or walk the pattern 200 again in response to issues or errors that may require clarification.

As shown the environmental devices 212, 214, 216, 218 are randomly placed within the communications environment 201 at coordinates:
Environmental device 212—$x_1,y_1,z_1$
Environmental device 214—$x_2,y_2,z_2$
Environmental device 216—$x_3,y_3,z_3$
Environmental device 218—$x_4,y_4,z_4$ The coordinates for the environmental devices 212, 214, 216, 218 are relative to a coordinate system $x_0,y_0,z_0$ (i.e., the origin is referenced as 0,0,0). The location of a fifth device (not shown), the target device $x_5,y_5,z_5$, may be found using the following equations which assume the far-field approximation for electromagnetic fields of energy loss (e.g., inverse-square law) proportional to $1/r^2$ and that the Received Signal Strength Indicator (RSSI) value for each receiver is proportional to the power signal strength to distance described by the equation RSSI=Power*k/r^2:

$$RSSI_1/RSSI_2 = k*P*R_2^2/(k*PR_1^2)$$

$R_2$ is the radial vector from the environmental device 214 to the target device and $R_1$ is the radial vector from the environmental device 212 to the target device. In one embodiment, the constant of transmission k and transmit power level P are the same for all devices and cancel out of the ratio above to produce the simplified ratio of power signal strength to distance equation:

$$RSSI_1/RSSI_2 = R_2^2/R_1^2 = b$$

The same ratios may be utilized for $R_2$, $R_3$ and $R_4$ to $R_1$ to provide the simplified ratio of power signal strength to distance equations:

$$RSSI_1/RSSI_3 = R_3^2/R_1^2 = c$$

$$RSSI_1/RSSI_4 = R_4^2/R_1^2 = d$$

The radial vectors between transceivers/sensors equations that relate the intersection of the radial vectors $R_1$, $R_2$, $R_3$ and $R_4$ may be utilized to find the location of the target device, $x_5, y_5, z_5$ are:

$$R_1^2 = (x_5-x_1)^2 + (y_5-y_1)^2 + (z_5-z_1)^2$$

$$R_2^2 = (x_5-x_2)^2 + (y_5-y_2)^2 + (z_5-z_2)^2$$

$$R_3^2 = (x_5-x_3)^2 + (y_5-y_3)^2 + (z_5-z_3)^2$$

$$R_4^2 = (x_5-x_4)^2 + (y_5-y_4)^2 + (z_5-z_4)^2$$

The radial vectors may all be related to $R_1$ by the constants b, c and d above as a combination of radial vectors and power signal strength to distance equations:

$$R_1^2 = (x_5-x_1)^2 + (y_5-y_1)^2 + (z_5-z_1)^2$$

$$b*R_1^2 = (x_5-x_2)^2 + (y_5-y_2)^2 + (z_5-z_2)^2$$

$$c*R_1^2 = (x_5-x_3)^2 + (y_5-y_3)^2 + (z_5-z_3)^2$$

$$d*R_1^2 = (x_5-x_4)^2 + (y_5-y_4)^2 + (z_5-z_4)^2$$

In this embodiment, b, c and d are the ratios of the RSSIs measured at each device relative to environmental device 212. As the first environmental devices 212, 214, 216, 218 ($\{x_1,y_1,z_1\}$ $\{x_2,y_2,z_2\}$ $\{x_3,y_3,z_3\}$ $\{x_4,y_4,z_4\}$) have known coordinates and the constants b-d are measured values and therefore known, there are 4 equations with 4 unknowns ($R_1$, $x_5, y_5, z_5$) which will result in a determined solution which will find the target device $x_5, y_5, z_5$.

Figure 3:
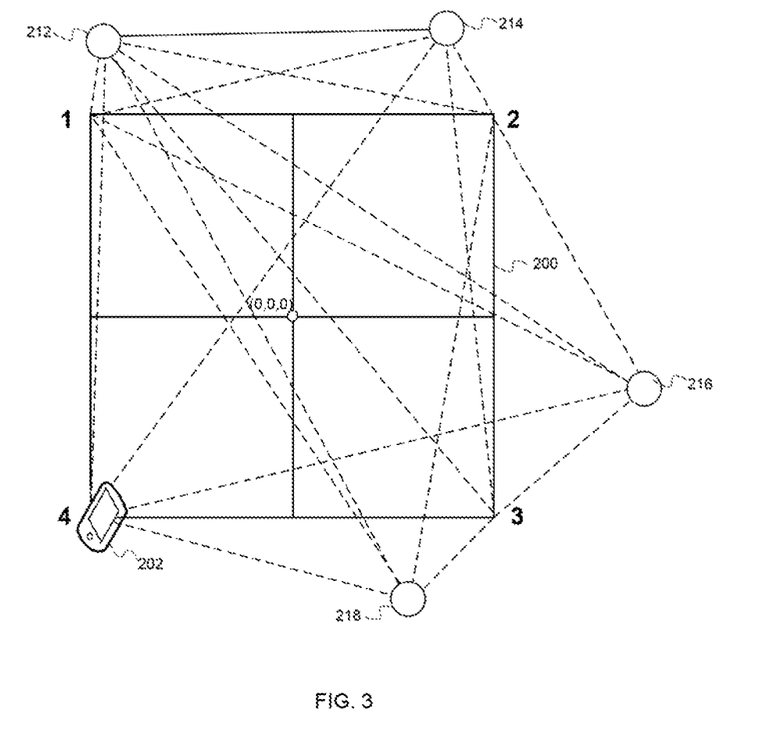
FIG. 3 is a pictorial representation of the location pattern of FIG. 2 in accordance with an illustrative embodiment.

FIG. 3 is another pictorial representation of the location pattern 200 of FIG. 2 in accordance with an illustrative embodiment. The location pattern 200 further illustrates the distances between each of the locations 1, 2, 3, 4 and the environmental devices 212, 214, 216, 218. As shown the wireless device 202 may determine the distance between the wireless device 202 and each of the respective environmental devices 212, 214, 216, 218 at least at the locations 1, 2, 3, 4. In one embodiment, the user may select a button on an application or graphical user interface to perform the measurements between the wireless device 202 and the environmental devices 212, 214, 216, 218 as the user stops at each of the locations 1, 2, 3, 4. The user may also be prompted how far, where, or when to walk to perform the process of FIG. 3.

The calibration information determined as shown in FIGS. 2 and 3 may be utilized with wireless signal information received from a target device to locate the target device. As a result, the location information may be displayed or otherwise communicated to users and/or devices for finding or locating the target device. In one embodiment, the target device may be lost, moving, hidden, in an unknown location, or may otherwise require locating. Measurements regarding signal strength may also be taken by the environmental devices 212, 214, 216, 218 and sent to the wireless device 202.

In one embodiment, real-time location of the target device, such as a wireless tag, may communicate with three or more nearby wireless devices, such as the environmental devices 212, 214, 216, 218, to determine an associated position. The random environmental devices 212, 214, 216, 218 may represent any number of devices, such as cell phones, laptops, headphones, appliances, fixtures, network integrated systems, and so forth. The RSSI values are read by the target device and the wireless device 202. In one example, four environmental devices 212, 214, 216, and 218 are required. In other examples, fewer devices may be required or utilized. In one example, Bluetooth is utilized, however, other wireless protocols, standards, or signals may also be utilized.

Figure 4:
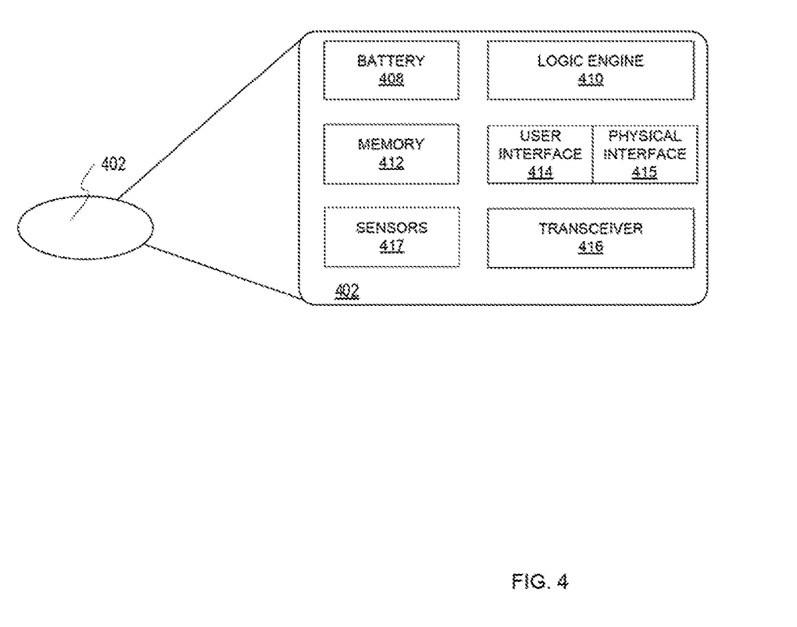
FIG. 4 is a block diagram of a target device in accordance with an illustrative embodiment.

FIG. 4 further illustrates a block diagram of a target device 402 in accordance with an illustrative embodiment. The target device 402 may be associated, linked, or connected to any number of wireless devices. The target device 402 may represent a device specifically used for locating or finding the target device 402, such as tags, identifiers, smart stickers, or other location components. The target device 402 may be attached or integrated with any number of other devices or items utilizing adhesives, wires, cables, connectors, fasteners, pockets, lanyards, an interference fit, or so forth. In another embodiment, the target device may represent any number of wireless devices that may execute a program or utilize logic to associated signal strength readings with any number of available environmental devices. For example, wireless devices may include smart appliances, speakers, safety equipment, intercoms, electrical systems, beacons, wearable devices, communications devices, computers, entertainment devices, vehicle systems, exercise equipment, or so forth.

The description of the target device 402 is similarly applicable to a host device, environmental devices, or other wireless devices as described and utilized herein. In one embodiment, the target device 402 may only communicate with authorized devices. Authorized communications may be performed utilizing one or more secured signals or connections, identifiers (e.g., passwords, device identifiers, biometrics, etc.), or so forth. The target device 402 may have any number of electrical configurations, shapes, and colors and may include various circuitry, connections, and other components utilized to perform the illustrative embodiments.

As described herein, the target device 402 may be utilized to determine the location and signal strength of applicable environmental devices from an origin (0,0,0) based on navigating a pattern or natural movements of a user/device associated with the target device 402. A calibration process may be performed for the target device 402 before using the target device to provide location information.

In one embodiment, the target devices 402 may include a battery 408, a logic engine 410, a memory 412, a user interface 414, a physical interface 415, a transceiver 416, and sensors 417. In some embodiments, not all of the components may be included each configuration or embodiment of the target device 402. For example, the target device 402 may represent a personal communication, computing, or entertainment device as are well known in the art.

The battery 308 is a power storage device configured to power the target device 302. In other embodiments, the battery 308 may represent a fuel cell, thermal electric generator, piezo electric charger, solar charger, ultra-capacitor, or other existing or developing power storage technology. In other embodiments, the target device 402 may be a passively powered device that may be powered by external forces (e.g., sunlight, wireless induction, movement, etc.).

The logic engine 410 is the logic that controls the operation and functionality of the target device 402. The logic engine 410 may include circuitry, chips, and other digital logic. The logic engine 410 may also include programs, scripts, and instructions that may be implemented to operate the logic engine 410. The logic engine 410 may represent hardware, software, firmware, or any combination thereof. For example, the logic engine 410 may represent discrete logic and circuits or integrated circuits. In one embodiment, the logic engine 410 may include one or more processors. The logic engine 410 may also represent an application specific integrated circuit (ASIC) or field programmable gate array (FPGA). The logic engine 410 may utilize transceiver measurements, signal information, user input, user preferences and settings, conditions, factors, and environmental conditions to determine the identity and signal strength of available environmental devices. This information may also be utilized to authenticate any number of other devices. In some embodiments, multiple forms of identifying information may be utilized to better secure requests authenticated through the target device 402.

In one embodiment, the logic engine 410 may coordinate sending relevant wireless signal information through the transceiver 416 to the host device or other external devices for locating the target device 402. In one embodiment, the logic engine 410 may determine the location of the target device 402 relevant to the user/host device in response to wireless signal information measured by the transceiver 416 as well as the calibration information received from the host device. The logic engine 410 may also perform any number of signal and mathematical equations and functions (e.g. signal/power decay per distance, linear extrapolation, polynomial extrapolation, conic extrapolation, French curve extrapolation, polynomial interpretation) to determine or infer the identity of the user from the sensor measurements as well as determine whether a biometric identifier or password is verifiably received. The logic engine 410 may utilize time and other measurements as causal forces to enhance a mathematical function utilized to perform the determinations, processing, and extrapolation performed by the logic engine 410.

The logic engine 410 may also process user input to determine access commands implemented by the target device 402 or sent to the target device 402 through the transceiver 416. Specific actions may be allowed based on transceiver measurements, extrapolated measurements, environmental conditions, proximity thresholds, and so forth. For example, the logic engine 410 may implement an audible, tactile, or visual alert in response to a tracking process being implemented from an external device. Any number of commands, instructions, flags, or signals may be sent to activate the alert features of the tracking device 402. As a result, the target device 402 may include a speaker, vibration component, LEDs, display, microphone or so forth.

The logic engine 410 is configured to perform all or a substantial portion of the processing needed for the illustrative embodiments. In one embodiment, the logic engine 410 may associate the target device 402 with one or more wireless devices. The logic engine 410 may also associate an identifier (e.g., SSID, IMEI, serial number, custom name, etc.) of the environmental devices with their associated power/signal strength readings and save the wireless signal information in the memory 412. The logic engine 410 may also track and record the initial or last known location of the target device 402. The target device 402 may be tracked directly if within range of the host device or indirectly (e.g. cellular signals, satellite signals, network signals, other users/mesh network nodes, etc.). The logic engine 410 may also facilitate the user in searching for, locating, and navigating to the target device 402 from the host device. In one embodiment, the logic engine 410 of the target device (or a host device) may execute a mapping application that facilitates the user in driving, walking, writing, or otherwise navigating to the location of the target device 02. For example, the logic engine 410 may provide instructions or commands for the user interface 414 including a speaker, vibrator, or other interface components to navigate to the target device 402.

In one embodiment, a processor included in the logic engine 410 is circuitry or logic enabled to control execution of a set of instructions. The processor may be one or more microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks.

The memory 412 is a hardware element, device, or recording media configured to store data or instructions for subsequent retrieval or access at a later time. The memory 412 may represent static or dynamic memory. The memory 412 may include a hard disk, random access memory, cache, removable media drive, mass storage, or configuration suitable as storage for data, instructions, and information. In one embodiment, the memory 412 and the logic engine 410 may be integrated. The memory may use any type of volatile or non-volatile storage techniques and mediums. The memory 412 may store information related to the user, target device 402, host device, environmental devices, and other applicable devices. In one embodiment, the memory 412 may store, display, or communicate instructions, programs, drivers, or an operating system for controlling the user interface 414 including one or more LEDs or other light emitting components, speakers, tactile generators (e.g., vibrator), and so forth. The memory 412 may also store environmental readings, user input required for specified data, functions, or features, authentication settings and preferences, thresholds, conditions, signal or processing activity, historical information, proximity data, and so forth. The memory 412 may also store instructions, applications, or so forth for tracking and locating the target device 402.

The transceiver 416 is a component comprising both a transmitter and receiver which may be combined and share common circuitry on a single housing. The transceiver 416 may alternatively be a receiver and/or transmitter or signal detector. The transceiver 416 may communicate utilizing NFMI, Bluetooth, Wi-Fi, ZigBee, Ant+, near field communications, wireless USB, infrared, mobile body area networks, ultra-wideband communications, cellular (e.g., 3G, 4G, 5G, PCS, GSM, etc.), infrared, or other suitable radio frequency standards, networks, protocols, or communications. For example, the transceiver 416 may coordinate readings of the environmental devices available to the target device 402 utilizing Bluetooth or Wi-Fi communications. The transceiver 416 may also be a hybrid transceiver that supports a number of different communications. For example, the transceiver 416 may communicate with the host device, wireless devices, or other systems utilizing wired interfaces (e.g., wires, traces, etc.), NFC, or Bluetooth communications. The transceiver 416 may also detect amplitudes and infer distance between the target device 402 and external devices, such as the wireless device/host device.

In one embodiment, the transceiver 416 may be configured to determine a location of the target device 402 utilizing signal strength, wireless triangulation, or directional feedback as are described herein. For example, the transceiver 416 may include one or more antennas that facilitate detecting the amplitude, communicated direction of signals received, and so forth. The transceiver 416 may include multiple directional antennas that indicate the direction of signals received from the environmental devices. The distance between the target device 402 as well as the time stamp associated with when a signal was received may be utilized to determine a direction and/or location to the environmental devices and/or host device. Similarly, any number of tables, distances, thresholds, database entries, or historical information may be utilized to identify available environmental devices and determine a distance and direction between the target device 402 and the other devices.

The components of the target device 402 may be electrically connected utilizing any number of wires, contact points, leads, busses, wireless interfaces, or so forth. In addition, the target device 402 may include any number of computing and communications components, devices or elements which may include busses, motherboards, circuits, chips, sensors, ports, interfaces, cards, converters, adapters, connections, transceivers, displays, antennas, and other similar components.

The physical interface 415 is hardware interface of the target device 402 for connecting and communicating with wireless devices, tags, or other electrical components, devices, or systems. The physical interface 415 may include any number of pins, arms, or connectors for electrically interfacing with the contacts or other interface components of external devices or other charging or synchronization devices. For example, the physical interface 415 may be a micro USB port. In one embodiment, the physical interface 415 is a magnetic interface that automatically couples to contacts or an interface of a wireless device or tag. In another embodiment, the physical interface 415 may include a wireless inductor for charging the target device 402 without a physical connection to a charging device. The physical interface 415 may also include a port for recharging the battery 408 or a receptacle for changing out the battery 408 once used up or needing a recharge.

The user interface 414 is a hardware interface for receiving commands, instructions, or input through the touch (haptics) of the user, voice commands, or predefined motions. For example, the user interface 414 may include one or more buttons, dials, switches, toggles, touch screens, one or more cameras/image sensors, microphones, speakers, or so forth. The user interface 414 may be utilized to control the other functions of the target device 402. The user interface 414 may include the LED array, one or more touch sensitive buttons or portions, a miniature screen or display, or other input/output components. The user interface 414 may be controlled by the user or based on commands received from the wireless device. For example, the user may turn on, reactivate, implement searches, or provide feedback utilizing the user interface 414.

In one embodiment, the user interface 414 may include a biometric scanner that may be utilized to scan a fingerprint (e.g., the index finger), iris, DNA, face, or other identifying portion of a user to authenticate a user, request, functionality, or so forth. The user interface 414 of the target device 402 may store identifying information for one or more biometrics. In one embodiment, the biometric data of the user may be encrypted and stored within a secure portion of the memory 412 to prevent unwanted access or hacking. The target device 402 may also be attached to or worn by a user and may store important biometric data, such as medical information (e.g., medical conditions, allergies, logged biometrics, contacts, etc.) that may be shared in response to an emergency.

Search requests may be made from the user interface of external devices. In one embodiment, the user may provide user feedback for authenticating a search request by tapping, swiping, or otherwise interacting with the user interface of a host device. Alerts and indicators may provide feedback and input to the user as needed. The user interface 414 may also provide a software interface including any number of icons, soft buttons, windows, links, graphical display elements, and so forth for receiving user input.

In one embodiment, the target device may include the sensors 417. The sensors 417 may include inertial sensors, accelerometers, gyroscopes, magnetometers, water, moisture, or humidity detectors, impact/force detectors, thermometers, photo detectors, miniature cameras, microphones, and other similar instruments for identifying the location, environment, and utilization of the target device including position, orientation, motion, and so forth.

Externally connected wireless devices as well as the host device may include components similar in structure and functionality to those shown for the target device 402. For example, a wireless device may include any number of processors, batteries, memories, busses, motherboards, chips, transceivers, peripherals, sensors, displays, cards, ports, adapters, interconnects, sensors, and so forth. In one embodiment, the wireless device may include one or more processors and memories for storing instructions. The instructions may be executed as part of an operating system, application, browser, or so forth to implement the features herein described. For example, the user may set preferences for using and locating the target device 402. For example, target devices 402 may periodically send wireless signal information or a ping to indicate their presence to a device being utilized to locate the target device. The time period used may be extended as the battery of the target device 402 is closer to being exhausted. In one embodiment, the target device 402 may be magnetically or physically coupled to the wireless device to be recharged or synchronized. The host device or other wireless devices may also execute an application with settings or conditions for updating, synchronizing, sharing, saving, processing requests and utilizing locating information.

Figure 5:
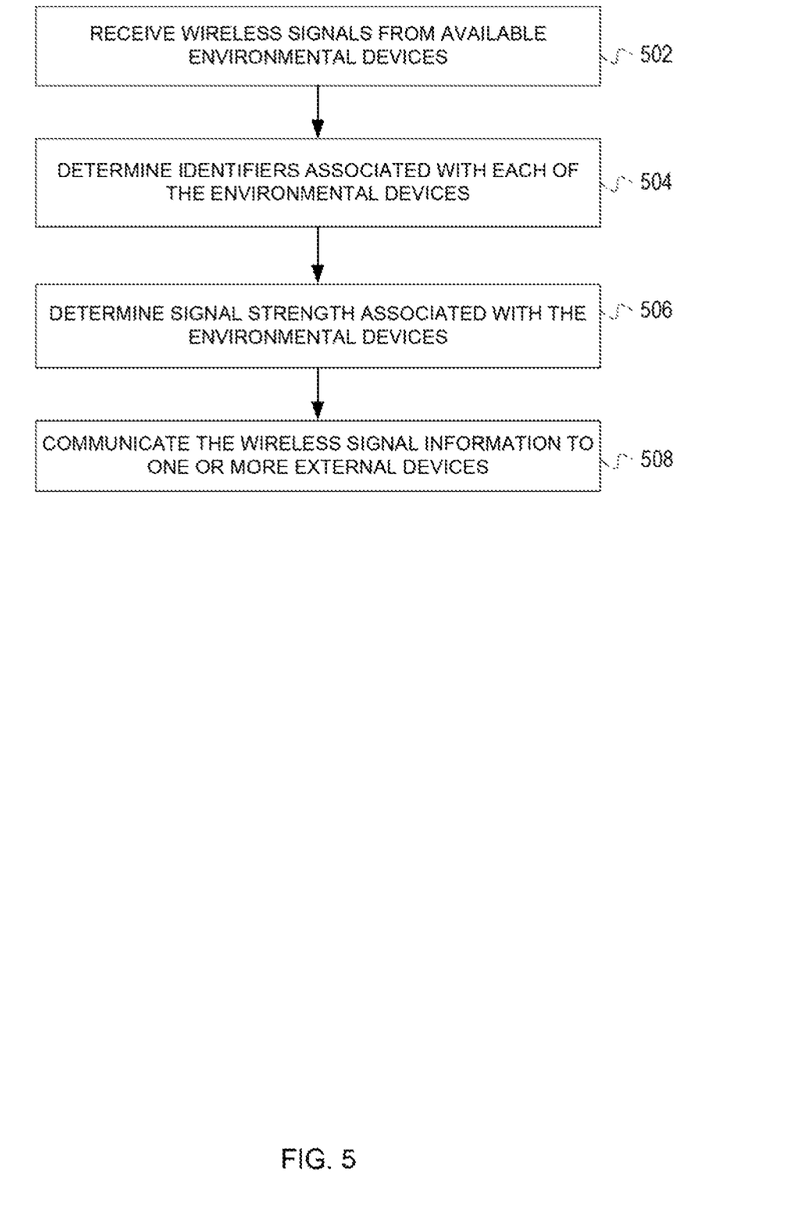
FIG. 5 is a flowchart of a process for communicating wireless signal information from a tracking device in accordance with an illustrative embodiment.

FIG. 5 is a flowchart of a process for communicating wireless signal information from a tracking device in accordance with an illustrative embodiment. The process of FIG. 5 may be implemented by a tracking device, such as tag, smart phones, tablets, entertainment devices, identifiers, smart watches, fitness trackers, smart jewelry, or so forth.

The process of FIG. 5 may begin by receiving wireless signals from available environmental devices (step 502). The environmental devices may represent any number or type of devices that communicate wireless signals. The signals may represent any number of existing, developing, or future standards, protocols, or configurations. The locating device may be configured to receive the signals from the different environmental devices. In one example, the environmental devices may represent Bluetooth devices, such as speakers, televisions, appliances, computers, tablets, or so forth.

Next, the target device determines identifiers associated with each of the environmental devices (step 504). The identifiers may represent any number of hardware, software, or firmware identifiers. In one embodiment, the device identifiers may represent service set identifiers (SSIDs). In one embodiment, identifiers that are automatically assigned to each environmental device by a manufacturer, network, or other service provider.

Next, the target device determine signal strengths associated with the environmental devices (step 506). The signal strengths may be measured for each of the available environmental devices. In one embodiment, the measurements may be performed multiple times to determine accurate results. Any number of mathematical processes may also be utilized (e.g., average, mean, standard deviation, etc.) to more accurately determine the applicable signal strength. In one embodiment, the target devices may include a transceiver or a signal detector for detecting different signals. In one embodiment, the target devices may detect the signal strength of different radio signals (e.g., Bluetooth, Wi-Fi, near field magnetic induction, etc.).

Next, the target device communicates the wireless signal information to one or more external devices (step 508). The target device may communicate the wireless signal information at preset times, time intervals, based on specified actions, thresholds, conditions, or criteria. In one embodiment, the wireless signal information may include a device identifier (e.g., SSID, name, label, IMEI, IP address, etc.) and a signal strength measurement. In other embodiment, the target device may include an identification of the wireless signal or protocol, directional communication information to the environmental devices, distance information (if known) to the environmental devices.

Figure 6:
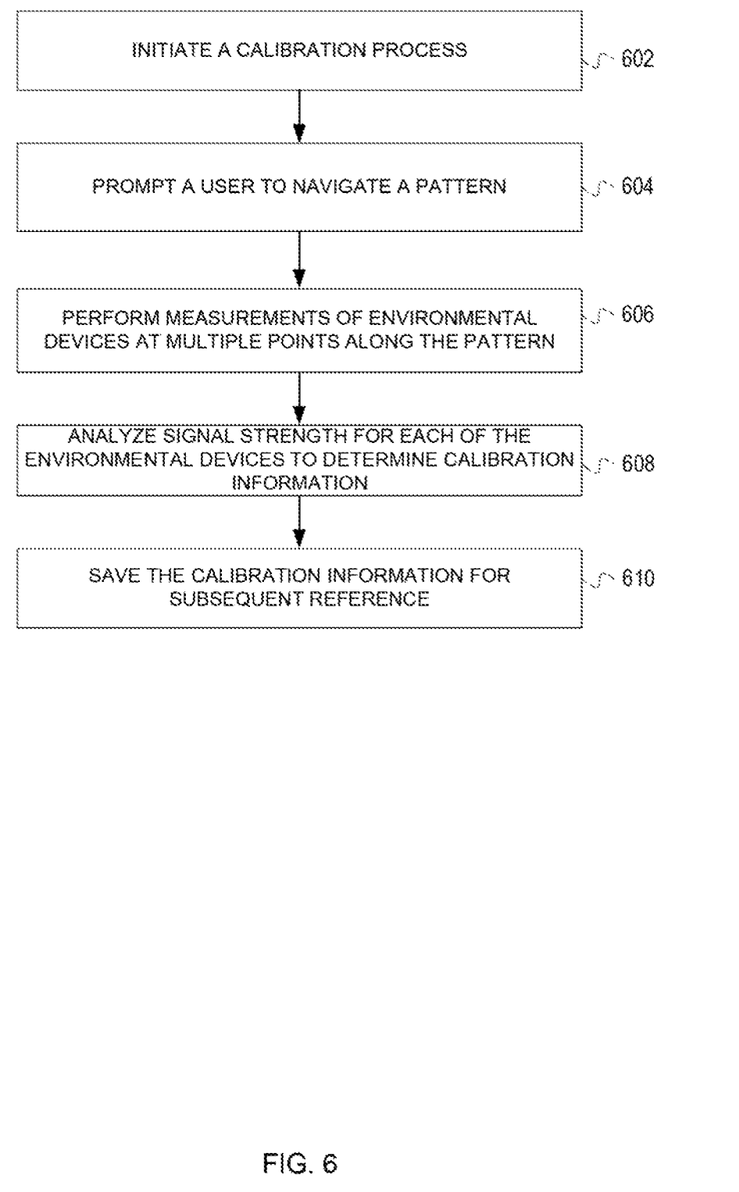
FIG. 6 is a flowchart of a calibration process in accordance with an illustrative embodiment.

FIG. 6 is a flowchart of a calibration process in accordance with an illustrative embodiment. In one embodiment, the processes of FIGS. 6 and 7 may be implemented by a host device, such as a smart phone, tablet, or other wireless device. In another embodiment, the process of FIG. 6 may be performed utilizing a target device as part of an initiation or activation process for the target device (instead of the host device). For example, the process may be performed for a token, tag, or tracker in one or more environments where the tracking device may be utilized. To begin the host device may initiate a calibration process (step 602). The calibration process may be initiated in response to the user opening a location application for locating the target device, requesting a location of the target device (e.g., through a virtual assistant, based on a request, etc.), in response to a user-specified action, distance thresholds (e.g., between the target device and the host device, separation of the target device, etc.). The calibration process may be initiated in response to any number of automated or manual processes. The calibration process may be initiated in response to a command, instruction, or signal received from the host device. The calibration process may also be performed for each of the environmental devices described herein as well.

Next, the host device prompts a user to navigate a pattern (step 604). In embodiment, the pattern may be preset (e.g., such as a square of a known shape). In other embodiments, the pattern may be set based on the available space or footprint of the applicable communications/location environment. Shapes including a circle, rectangle, triangle, pentagon, or so forth. The user may also walk a line or zig zag pattern. The user may walk, drive, or otherwise navigate the pattern. In one embodiment, the host device may be integrated with a drone, vehicle, remote controlled vehicle, or other device, component, or system. In one embodiment, the user may be prompted to take the device (e.g., host device, target device, etc.) to a center portion of an environment, an origin, or other portion of the environment to perform the calibration process.

Next, the host device performs measurements of environmental devices at multiple points along the pattern (step 606). The measurements may be performed at corners, vertices, or other default or designated points/locations along the pattern. The measurements may include identifying the environmental devices in communication with the host device and determining the signal strength. In some embodiments, the measurements may be performed utilizing a transceiver, signal receiver, or other measurement device. The coordinates or relative positions of the environmental devices may also be determined. The determined signal strength and identifiers may also be denoted, communicated, or otherwise saved for subsequent reference.

Next, the host device analyzes the signal strength for each of the environmental devices to determine calibration information (step 608). The host device may utilize a processor or logic to analyze the signals received. For example, the host device may execute an application that processes the measurements to generate the calibration information. The host device may perform local analysis of the measurements or may communicate the measurements to one or more external devices to generate the calibration information. For example, the measurements may be sent to a cloud network that utilizes servers to generate the calibration information.

Next, the host device saves the information for subsequent reference (step 610). In one embodiment, the host device may save the information locally. In other embodiments, the measurements and calibration information may be sent to one or more external devices, systems, equipment, or components. The calibration information may be utilized specifically to locate one or more target devices that are lost or otherwise need accurate location information determined. For example, the calibration information may be compared against signal strength measurements performed by a target device to determine the location of the target device.

Figure 7:
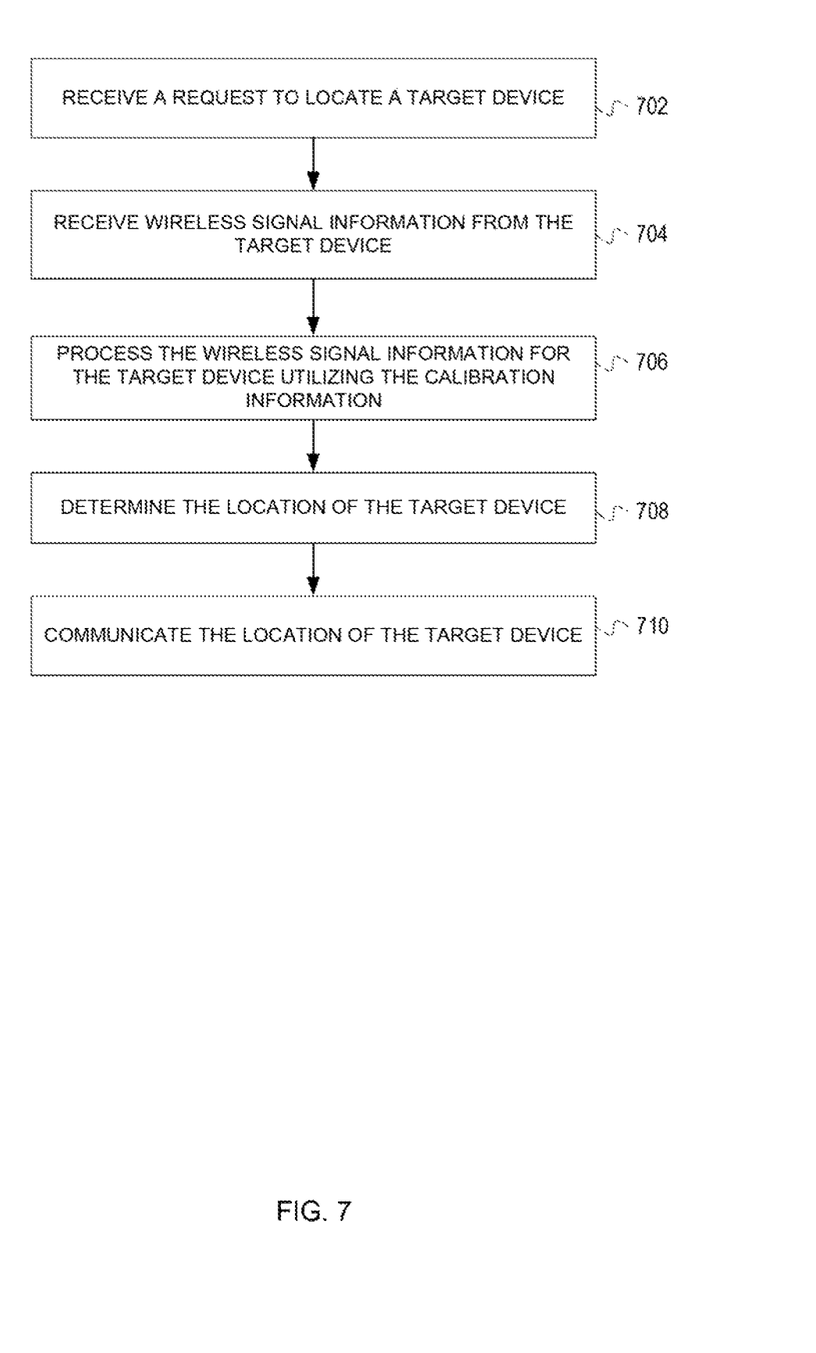
FIG. 7 is a flowchart of a process for locating a target device in accordance with an illustrative embodiment.

FIG. 7 is a flowchart of a process for locating a target device in accordance with an illustrative embodiment. The target device may represent any number of lost or other devices (stationary or moving) that there is a need to locate or find. The target device or target devices may be associated with one or more users, vehicles, personal items, business items/devices, animals, military equipment, or so forth.

In one embodiment, the process may begin by receiving a request to locate a target device (step 702). The request may be sent based on an automatic or manual process. For example, the request may be automatically initiated in response to the target device not moving for a specified time period (e.g., 30 mins, 2 hours, 24 hours, 48 hours, etc.), the target device is out-of-range or disconnected from a specified wireless device (e.g., beacon, cell phone, tower, etc.).

Next, the host device receives wireless signal information from the target device (step 704). The wireless signal information may be received directly from the target device or indirectly through any number of networks or third-party devices. In one example, the host device may receive a Bluetooth, Wi-Fi, or cellular signal from the target device. For example, the wireless signal information may be received from a cloud-based system. As previously noted the wireless signal information may identify the environmental devices in communication with the target device and indicate the signal strength received from each of the environmental devices.

Next, the host device processes the wireless signal information for the target device utilizing the calibration information (step 706). The signal strength information may be analyzed to determine the location of the target device relative to the host device or other applicable devices/users. The calibration information may include calibration information from the host device as well as the target device. For example, the target information may specify the strength of the environmental devices and their relative coordinates/positions if known.

Next, the host device determines the location of the target device (step 708). The location of the target device may be determined relevant to the host device or other applicable devices within the environment associated with the target device. In one embodiment, multiple power to signal distance equations may be simplified and reduced to determine the location of the target device. For example, the following for v, b*v, c*v, and d*v may be utilized as a combination of radial vectors and power signal strength to distance equation for partial square method implementation. The solutions for x, y, z may be referenced as coordinate solutions of the target device and the solution for v may represent the solution for the square of radial vector R1. As shown below the measurement "a" as shown below represents one length of one side of the square, where the pattern is a square ("a" may alternatively represent a portion of the pattern as a side, radius, segment, etc.).

$$b = \frac{rssi1}{rssi2} \quad c = \frac{rssi1}{rssi3} \quad d = \frac{rssi1}{rssi4}$$

Given $$v=(x-a)^2+(y-a)^2+z^2$$

$$b \cdot v=[(x+a)^2+(y-a)^2+z^2]$$

$$c \cdot v=[(x+a)^2+(y+a)^2+z^2]$$

$$d \cdot v=[(x)^2+(y+a)^2+z^2]$$

Next, the host device communicates the location of the target device (step 710). In one embodiment, the host device may utilize a mapping application to display the location of the target device to one or more users. In another embodiment, the host device may communicate the location of the target device to remote users/devices. As previously noted, the location of the target device may be communicated directly or through one or more networks.

The illustrative embodiments provide a system, method, and devices for locating one or more target devices. The illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computing system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (e.g., through the Internet using an Internet Service Provider).

Figure 8:
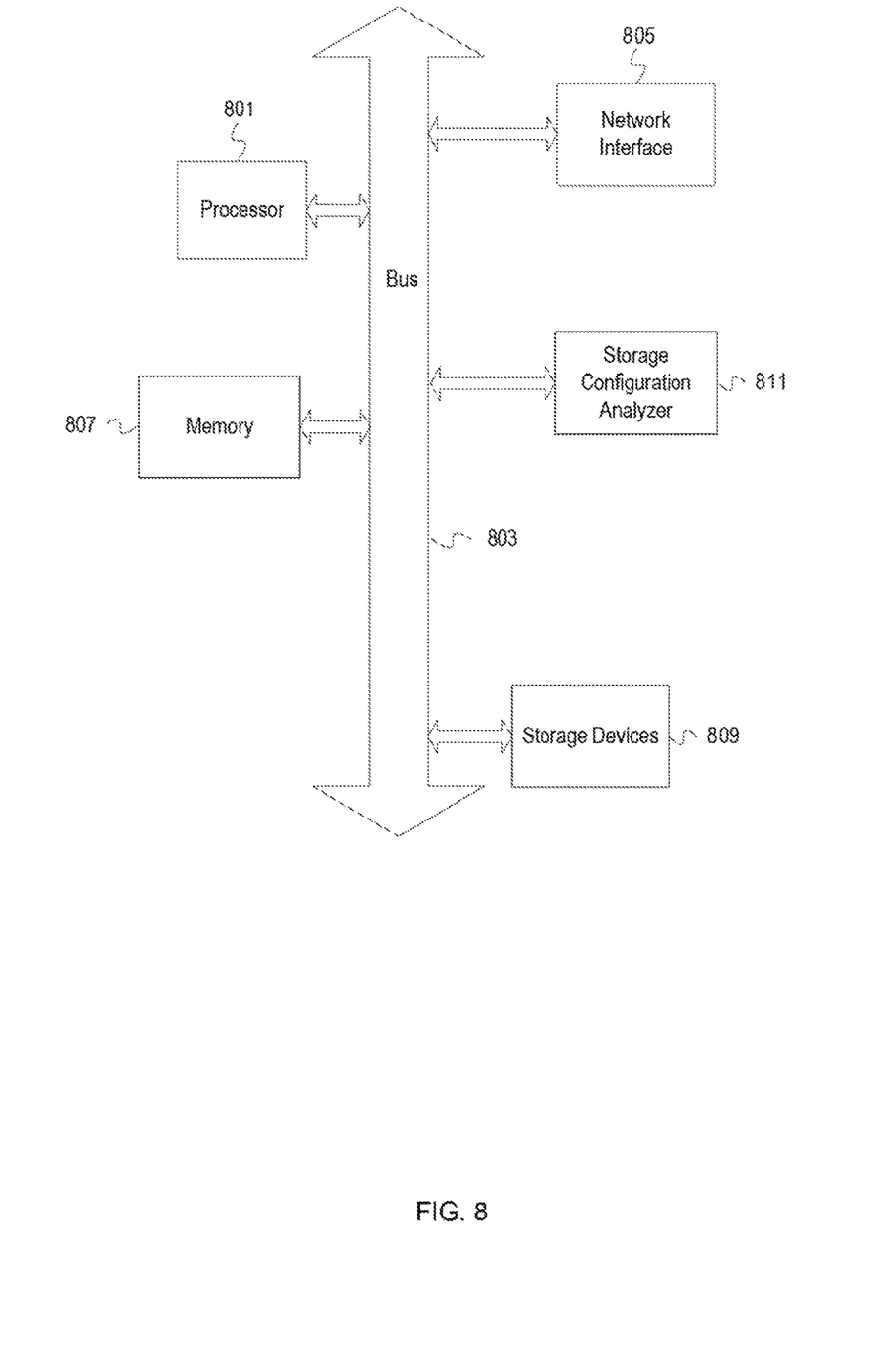
FIG. 8 depicts a computing system in accordance with an illustrative embodiment.

FIG. 8 depicts a computing system 800 in accordance with an illustrative embodiment. For example, the computing system 800 may represent a device, such as the wireless device 104 or tablet 116 of FIG. 1. The computing system 800 may represent a host device, target device, or environmental device. The computing system 800 may determine signal strength (e.g., RSSI), available environmental devices and their associated identifiers, execute location applications, receive user input, and provide audio, video, textual, visual, or tactile feedback to find the target devices, or so forth. The computing system 800 includes a processor unit 801 (possibly including multiple processors, multiple cores, multiple nodes, and/or implementing multi-threading, etc.).

In one embodiment, the computing system 800 includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system 800 also includes a bus 803 (e.g., PCI, ISA, PCI-Express, HyperTransport®, InfiniBand®, NuBus, etc.), a network interface 805 (e.g., an ATM interface, an Ethernet interface, a Frame Relay interface, SONET interface, wireless interface, etc.), and a storage device(s) 809 (e.g., optical storage, magnetic storage, etc.). The system memory 807 embodies functionality to implement embodiments described above. The computing system 800 may also include one or more of a receiver, transceiver, or signal detector for determining an identifier of other wireless device, signal strength, and other information (e.g., relative direction, used signal protocol, etc.). The system memory 807 may include one or more functionalities that facilitate determining a location and finding/locating a target device. Code may be implemented in any of the other devices of the computing system 800. Any one of these functionalities may be partially (or entirely) implemented in hardware and/or on the processing unit 801. For example, the functionality may be implemented with an application specific integrated circuit, in logic implemented in the processing unit 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801, the storage device(s) 809, and the network interface 805 are coupled to the bus 803. Although illustrated as being coupled to the bus 803, the memory 807 may be coupled to the processor unit 801.

The illustrative embodiments may be integrated into existing wireless devices, wireless beacons, wireless tokens, wireless stickers, or other devices. The various embodiments may be utilized for a target device, a locating device, and other environmental devices. In one embodiment, the devices may create a wireless profile for an environment associating general locations, directions, signal strength, signal type, identifiers, and other relevant information with all detectable devices whether permanent or movable.

The illustrative embodiments are not to be limited to the particular embodiments and examples described herein. In particular, the illustrative embodiments contemplate numerous variations in the type of ways in which embodiments may be applied to the location devices, methods, systems, software, processes, or so forth described herein. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments disclosed with greater particularity.

What is claimed is:

1. A method for locating a target device, comprising:
performing a calibration process by taking a plurality of measurements utilizing a host device receiving wireless signals from a plurality of environmental devices at points along a pattern navigated by a user associated with the host device;
analyzing signal strength for each of the plurality of environmental devices at the points along the pattern to determine calibration information;
receiving wireless signal information from a target device including at least signal strength associated with proximate ones of the plurality of environmental devices;
determining the location of the target device utilizing at least the calibration information and the wireless signal information.

2. A The method of claim 1, further comprising:
receiving a request to locate the target device.

3. A The method of claim 2, wherein the request is received based on user input to the host device.

4. A The method of claim 1, further comprising:
prompting the user to navigate the pattern and stopping at the points to take the plurality of measurements.

5. A The method of claim 1, wherein the location of the target device is determined utilizing wireless signal information from the target device to at least four of the plurality of environmental devices.

6. A The method of claim 1, further comprising:
communicating the location of the target device to one or more devices or users.

7. A The method of claim 1, further comprising:
displaying instructions for reaching the target device from the host device.

8. The method of claim 1, wherein the plurality of environmental devices communicate utilizing at least a Bluetooth signal, and wherein the target device and the plurality of environmental devices are randomly positioned within one of a plurality of wireless environments.

9. The method of claim 1, wherein the location of the target device is communicated in three dimensions.

10. A device for performing tracking, comprising:
a processor for executing a set of instructions;
a memory for storing the set of instructions;
a touch screen for interacting with a user based on the execution of the set of instructions, wherein the set of instructions are executed to:
perform a calibration process by taking a plurality of measurements utilizing a receiver of the device receiving wireless signals from environmental devices at points along a pattern navigated by the user associated with the host device, wherein the plurality of environmental devices are randomly applicable to one of a plurality of wireless environments;
analyze signal strength for each of the environmental devices to determine calibration information;
receive wireless signal information from a target device including at least signal strength associated with proximate ones of the environmental devices; and
determine the location of the target device utilizing at least the calibration information and the wireless signal information.

11. The device of claim 10, wherein the calibration process is initiated in response to receiving a request to locate the target device.

12. The device of claim 10, wherein the set of instructions are further executed to:
prompt the user to navigate the pattern and stop at the points to take the plurality of measurements.

13. The device of claim 10, wherein the location of the target device is located utilizing signal strength to distance equations for at least four of the environmental devices with respect to the target device, wherein the target device is randomly positioned with regard to the environmental devices, and wherein the plurality of environmental devices are randomly positioned in one of a plurality of wireless environments.

14. The device of claim 10, wherein the set of instructions communicate instructions for reaching the target device from the device.

15. The device of claim 10, wherein the environmental devices communicate utilizing at least a Bluetooth signal.

16. The device of claim 10, communicating the location to one or more devices.

17. A device for sending tracking information, comprising:
a processor for executing a set of instructions;
a memory for storing the set of instructions;

a transceiver for receiving wireless signals from available environmental devices and identifying the available environmental devices, wherein the available environmental devices are randomly positioned within one of a plurality of wireless environments, and wherein the set of instructions are executed to:

determine identifiers associated with each of the available environmental devices;

determine signal strength associated with each of the available environmental devices;

communicate the wireless signal information including at least the identifiers and the signal strength to one or more external devices.

18. The device of claim 17, wherein the set of instructions are further executed to:

indicate a general location if known.

19. The device of claim 17, wherein the set of instructions are further executed to:

communicate the wireless signal information periodically.

20. The device of claim 17, wherein the set of instructions are further executed:

communicate an alert including at least the identifiers and the signal strength in response to receiving a command from an external device.

* * * * *

UNITED STATES PATENT AND TRADEMARK OFFICE
CERTIFICATE OF CORRECTION

PATENT NO. : 10,123,297 B1
APPLICATION NO. : 15/674252
DATED : November 6, 2018
INVENTOR(S) : Michael John Harney et al.

Page 1 of 1

It is certified that error appears in the above-identified patent and that said Letters Patent is hereby corrected as shown below:

Claim 2, Line 1, change "A The" to --The--

Claim 3, Line 1, change "A The" to --The--

Claim 4, Line 1, change "A The" to --The--

Claim 5, Line 1, change "A The" to --The--

Claim 6, Line 1, change "A The" to --The--

Claim 7, Line 1, change "A The" to --The--

Signed and Sealed this
First Day of January, 2019

Andrei Iancu
*Director of the United States Patent and Trademark Office*